(12) United States Patent
Dantlgraber et al.

(10) Patent No.: US 6,810,989 B1
(45) Date of Patent: Nov. 2, 2004

(54) SYSTEM FOR INSULATING THE SOUND EMANATING FROM A MOTOR/PUMP UNIT

(75) Inventors: Jörg Dantlgraber, Lohr am Main (DE); Ernst Knollinger, Pasching (AT)

(73) Assignee: Bosch Rexroth AG, Lohr/Main (DE)

( * ) Notice: Subject to any disclaimer, the term of this patent is extended or adjusted under 35 U.S.C. 154(b) by 0 days.

(21) Appl. No.: 10/148,871

(22) PCT Filed: Nov. 15, 2000

(86) PCT No.: PCT/EP00/11269
§ 371 (c)(1),
(2), (4) Date: Oct. 17, 2002

(87) PCT Pub. No.: WO01/44663
PCT Pub. Date: Jun. 21, 2001

(30) Foreign Application Priority Data
Dec. 14, 1999 (DE) .......................... 199 60 224

(51) Int. Cl.$^7$ ................................. H02K 5/24
(52) U.S. Cl. ............... 181/202; 181/198; 181/200; 123/195 R; 15/326; 417/312; 417/423.14; 417/423.15
(58) Field of Search .................. 181/198–210; 417/312, 119, 415, 423.5, 423.8, 423.14; 415/196, 197, 119

(56) References Cited

U.S. PATENT DOCUMENTS

| | | | |
|---|---|---|---|
| 2,973,716 A | * 3/1961 | Thomas | 415/119 |
| 4,423,707 A | * 1/1984 | Sihon et al. | 123/195 R |
| 4,432,528 A | 2/1984 | Kretchman et al. | |
| 5,354,182 A | 10/1994 | Niemiec et al. | |
| 5,513,417 A | * 5/1996 | Kim et al. | 15/326 |
| 5,588,810 A | * 12/1996 | DiFlora et al. | 417/312 |
| 5,672,052 A | * 9/1997 | Ishida et al. | 417/312 |
| 6,155,805 A | * 12/2000 | Fry | 417/415 |

FOREIGN PATENT DOCUMENTS

| | | |
|---|---|---|
| AU | 537360 | 6/1984 |
| DE | 1938813 | 2/1970 |
| DE | 1962667 | 7/1970 |
| DE | 7917303 | 10/1979 |
| DE | 3602135 | 7/1992 |
| EP | 0035656 | 9/1981 |

OTHER PUBLICATIONS

Patent Abstracts of Japan vol. 018, No. 164 (M–1579), Mar. 18, 1994 & JP 05 332254 A (Mitsubishi Heavy Ind Ltd) Dec. 14, 1993.
JP 04 076277 A (Sanyo Electric Co Ltd) Mar. 11, 1992.
Patent Abstracts of Japan 07247119 Mar. 31, 97 (Matsushita Electric Works Ltd).

* cited by examiner

Primary Examiner—David Martin
Assistant Examiner—Renata McCloud
(74) Attorney, Agent, or Firm—Martin A. Farber

(57) ABSTRACT

In an arrangement comprising a motor/pump unit and a sound-deadening cover, the sound-deadening cover absorbs the airborne noise emitted by the motor/pump unit. On the other hand, the sound-deadening cover acts like the diaphragm of a loudspeaker for the structureborne noise emanating from the motor/pump unit. In order to absorb the structureborne noise as well, the sound-deadening cover is constructed as a sound-deadening hood, and is placed over the motor/pump unit in the operating condition, without touching it. During transportation, the sound-deadening hood and the motor/pump unit are supported on one another. The arrangement is used to absorb sound from units comprising a pump and a motor driving the latter.

11 Claims, 3 Drawing Sheets

SYSTEM FOR INSULATING THE SOUND EMANATING FROM A MOTOR/PUMP UNIT

FIELD AND BACKGROUND OF THE INVENTION

The invention relates to an arrangement for absorbing the sound emanating from a motor/pump unit, having a sound-deadening cover for the motor/pump unit.

An arrangement of this kind is known from U.S. Pat. No. 5,354,182. The motor/pump unit is surrounded by a sound-deadening cover. The motor/pump unit and the sound-deadening cover are held against one another. Angle pieces are screwed to the housing of the motor, being used to fix the motor/pump unit to an underlying support structure. Although an arrangement of this kind absorbs the airborne noise emitted by the motor/pump unit, the structureborne noise emanating from the motor/pump unit is transmitted to the cover and radiated to the outside. The cover, which deadens the airborne noise, acts like the diaphragm of a loudspeaker. This means that the larger the surface of the cover, the more sound is radiated.

The object on which the invention is based is to provide an arrangement of the type stated at the outset that not only absorbs airborne noise but also absorbs structureborne noise.

SUMMARY OF THE INVENTION

By the invention since the motor/pump unit and the sound-deadening hood do not touch one another in the operating condition, the structureborne noise of the motor/pump unit is not transmitted to the sound-deadening hood. On the other hand, however, since the motor/pump unit and the sound-deadening hood are supported on one another during transportation, they can be transported jointly in a simple manner.

Advantageous developments of the invention are provided. The catches for the joint transportation of the motor/pump unit and the sound-deadening hood are advantageously constructed in such a way that the motor/pump unit is held against the sound-deadening hood or that the sound-deadening hood is held against the motor/pump unit during transportation. If the catches are constructed in such a way that they engage in one another in a self-centering manner during the raising operation, the motor/pump unit and the sound-deadening hood cannot slip relative to one another during transportation. It is advantageous to provide one catch with a frustoconical outer surface and the other catch with a corresponding frustoconical inner surface. As an additional safeguard against vibration, a screwed joint is provided, which is passed through the catches. If the screwed joint is provided with transportation lugs at the head end, points of engagement for lifting gear are obtained in a simple manner.

BRIEF DESCRIPTION OF THE DRAWINGS

The invention is explained in greater detail below together with its further details by means of an exemplary embodiment illustrated in the drawings, in which.

DETAILED DESCRIPTION OF THE PREFERRED EMBODIMENT

Figure 1:
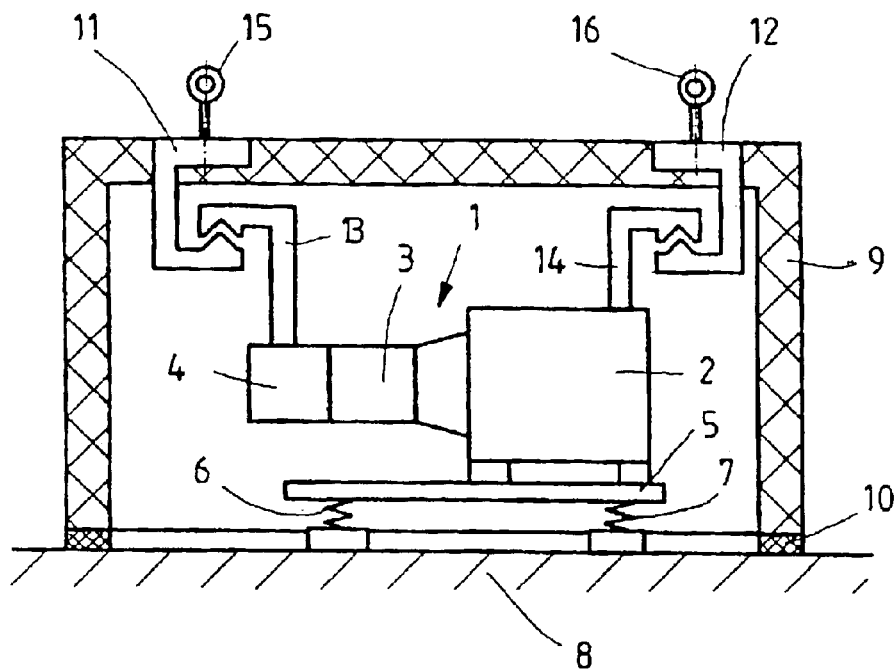
FIG. 1 shows a first arrangement for absorbing the sound emanating from a motor/pump unit in schematic representation.

Identical components are provided with identical reference numerals.

FIG. 1 shows a first arrangement according to the invention for absorbing the sound emanating from a motor/pump unit 1 in schematic representation. Two pumps 3 and 4 are held mechanically on an electric motor 2. The pumps 3 and 4 are driven by the electric motor 2. The electric motor 2 is held on a base plate 5. The base plate 5 is held on an underlying support structure 8, which is illustrated only schematically, by means of elastic fastening means, which are here illustrated as springs 6 and 7. The underlying support structure 8 can, for example, be a floor in a building, in which the motor/pump unit has been set up, or the frame of a machine into which the motor/pump unit is integrated. A sound-deadening hood 9 is placed over the motor/pump unit 1, surrounding the motor/pump unit 1 without touching it. The sound-deadening hood 9 absorbs the airborne noise of the motor/pump unit 1. An encircling interlayer 10 in the form of a strip is arranged between the sound-deadening hood 9 and the underlying support structure 8. The interlayer 10 is composed of a flexible material, e.g. rubber or foam. It is used to provide sound absorption between the underlying support structure 8 and the interlayer 10. Angular catches 11 and 12 are connected to the sound-deadening hood 9. Further angular catches 13 and 14 are held on the housing of the pump 4 and on the housing of the electric motor 2. The catches 11 to 14 are provided with guides, which engage in one another in a self-centering manner as the sound-deadening hood 9 is raised. The catches 11 and 12 are additionally provided with transportation lugs 15 and 16. In the operating condition of the arrangement according to the invention, which is illustrated in FIG. 1, the motor/pump unit 1 and the sound-deadening hood 9 are each supported independently on the underlying support structure 8. Here, the sound-deadening hood 9 is placed over the motor/pump unit 1 without touching it. If the motor/pump unit 1 and the sound-deadening hood 9 are to be transported, the sound-deadening hood 9 is first of all raised by the transportation lugs 15 and 16 until catches 11 and 13 and catches 12 and 14 engage. During this process, the self-centering construction of the guide surfaces of the catches 11 to 14 ensures a defined position of the motor/pump unit 1 relative to the sound-deadening hood 9. If the arrangement is lowered again, the motor/pump unit 1 comes to rest on the underlying support structure 8 first. As the sound-deadening hood 9 is lowered further, catches 11 and 13 and 12 and 14 disengage and the sound-deadening hood 9 then likewise comes to rest on the underlying support structure 8.

Figure 2:
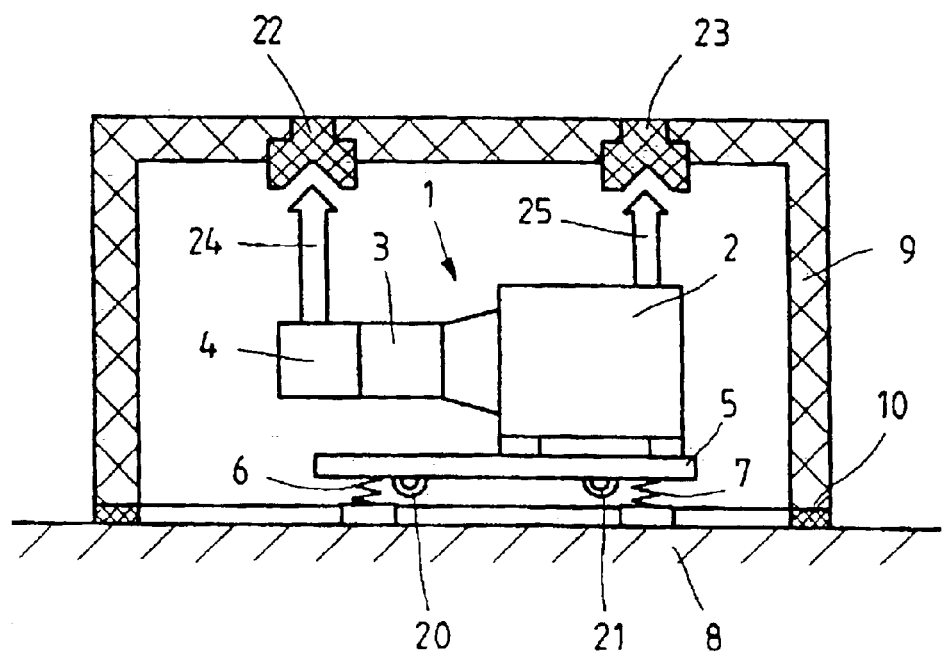
FIG. 2 shows a second arrangement for absorbing the sound emanating from a motor/pump unit in schematic representation.

FIG. 2 shows a second arrangement according to the invention for absorbing the sound emanating from a motor/pump unit 1, in schematic form. As in FIG. 1, the pumps 3 and 4 are held mechanically on the electric motor 2 and are driven by the latter. The base plate 5, on which the electric motor 2 is held, is provided with four lugs, of which only the lugs provided with the reference numerals 20 and 21 are visible in FIG. 2. They conceal two further lugs. The lugs are used to receive bars, by means of which the motor/pump unit 1 is raised and transported like a sedan chair, for example. Here too, the sound-deadening hood 9 is placed over the motor/pump unit 1 in such a way that it surrounds it without touching it. Catches 22 and 23 are held on the sound-deadening hood 9. Further catches 24 and 25 are held on the housing of the pump 4 and on the housing of the electric motor 2. The catches 22 to 25 are provided with guides, which engage in one another in a self-centering manner when the motor/pump unit 1 is raised. In the operating condition of the arrangement according to the invention, which is illustrated in FIG. 2, the motor/pump unit 1 and the sound-deadening hood 9 are each supported independently of one another on the underlying support structure 8, without touching one another. If the motor/pump unit 1 and the sound-deadening hood 9 are to be transported, the sound-deadening hood 9 is opened on opposite sides, allowing bars to be pushed through the lugs 20 and 21. The bars are raised until catch 22 rests on catch 24 and catch 23 rests on catch 25. During this process, the self-centering construction of the guide surfaces of the catches 22 to 25 ensures a defined position of the motor/pump unit 1 relative to the sound-deadening hood 9. If the arrangement is lowered again, the sound-deadening hood 9 comes to rest on the underlying support structure 8 first. As the motor/pump unit 1 is lowered further, catches 22 and 24 and 23 and 25 disengage and the motor/pump unit 1 then likewise comes to rest on the underlying support structure 8.

Figure 3:
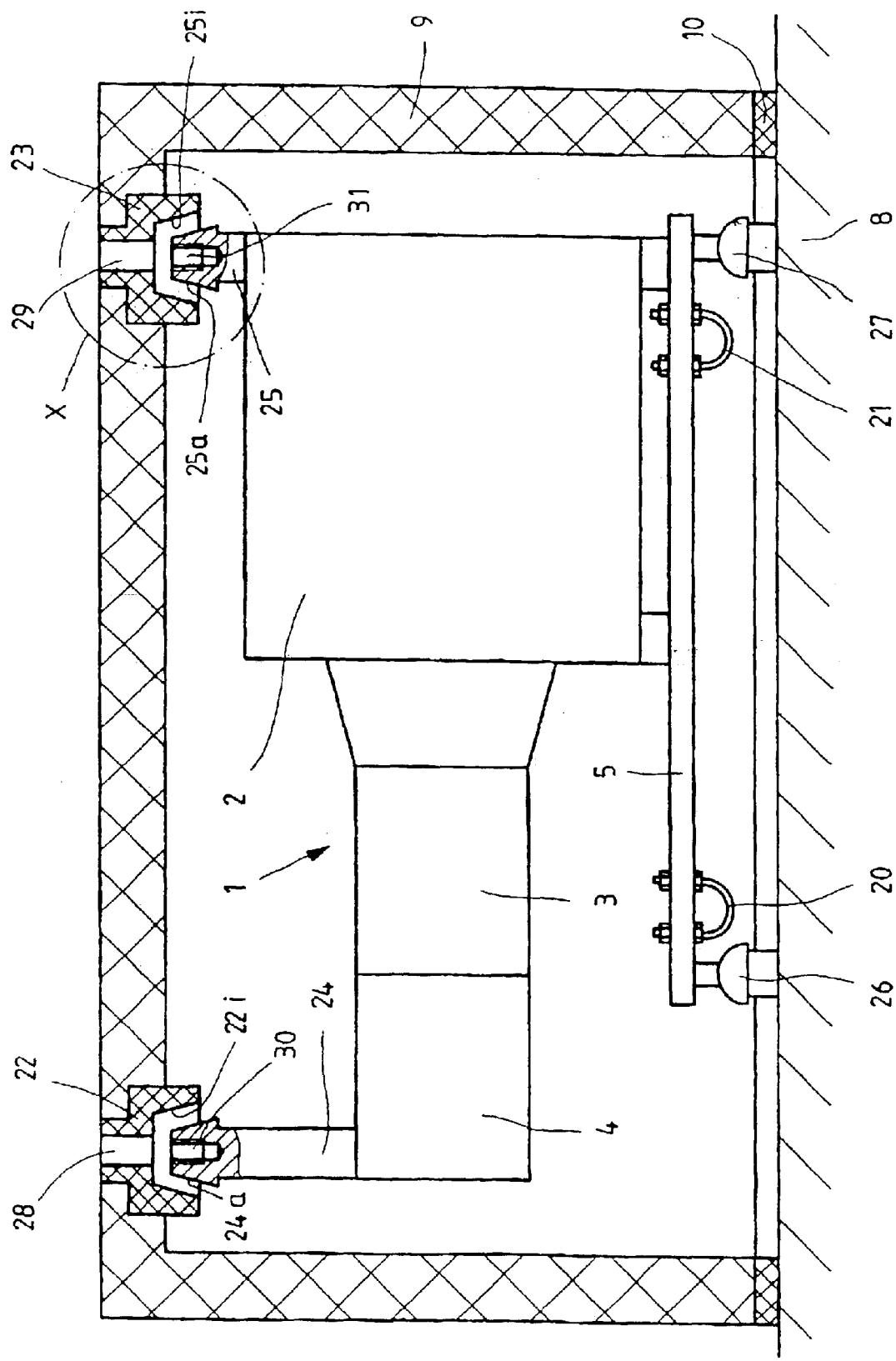
FIG. 3 shows a detailed illustration of the arrangement shown in FIG. 2

FIG. 3 shows a detailed illustration of the arrangement in FIG. 2, especially as regards the construction of the catches 22 to 25. In this exemplary embodiment, the base plate 5 is held on the underlying support structure via damping mounts, of which only damping mounts 26 and 27 can be seen in FIG. 3. Damping mounts are used for the elastic fixing of components. Catches 22 and 23 are constructed as catch sleeves with frustoconical inner surfaces 22i and 23i. Catches 24 and 25 are constructed as catch pins with frustoconical outer surfaces 24a and 25a. If the base plate 5 is raised—as described above—catch pin 24 engages in catch sleeve 22 and catch pin 25 engages in catch sleeve 23. In this arrangement, the frustoconical outer surfaces 24i and 25i of catch pins 24 and 25 are enclosed in a self-centering manner by the frustoconical inner surfaces 22i and 23i of catch sleeves 22 and 23. This configuration of the catches 22 to 25 prevents the sound-deadening hood 9 from slipping sideways relative to the motor/pump unit. Catch sleeves 22 and 23 are provided with central through holes 28 and 29. Catch pins 24 and 25 are each provided with an internal thread 30 and 31 respectively. Screws, which are passed through the through holes 28 and 29 and are screwed into the internal threads 30 and 31, hold the motor/pump unit 1 firmly in the raised position on the sound-deadening hood 9. When the motor/pump unit 1 has been screwed to the sound-deadening hood 9, the bars by means of which the motor/pump unit 1 has been raised can be removed.

Figure 4:
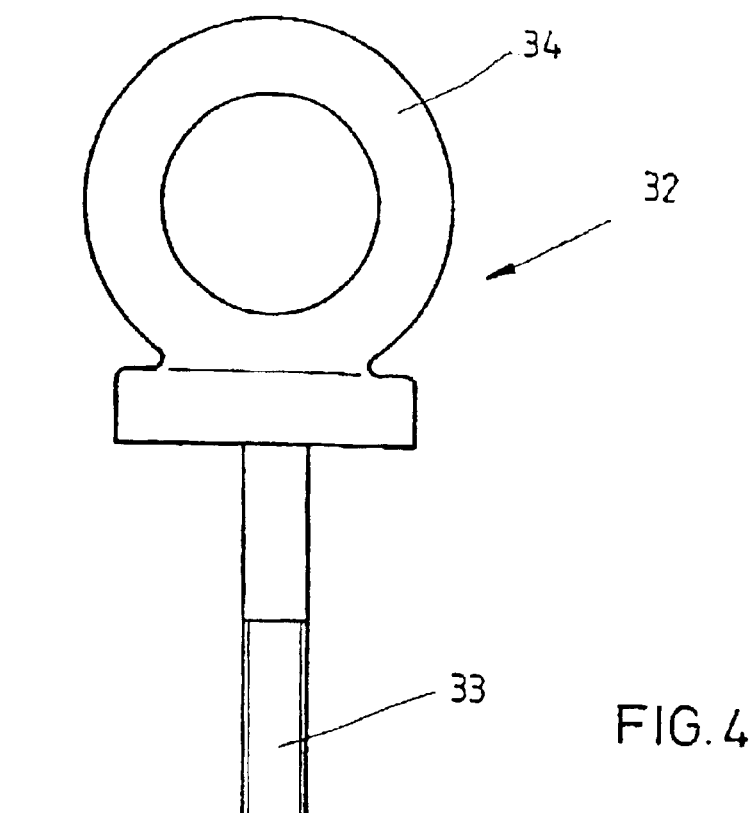
FIG. 4 shows a detail of the arrangement illustrated in FIG. 3.
Figure 4:
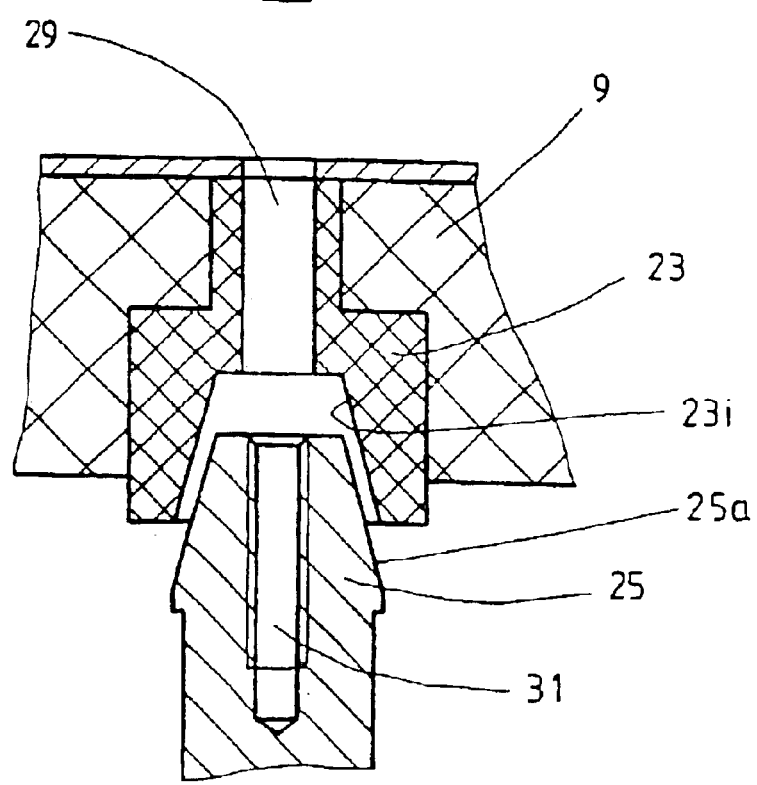

In FIG. 4, the detail X indicated in FIG. 3 is shown on an enlarged scale. FIG. 4 shows a fragmentary view of the sound-deadening hood 9, catch sleeve 23, catch pin 25 and a screw 32. The screw 32 is provided with an external thread 33. The head of the screw 32 is constructed as a transportation lug 34. If the motor/pump unit 1 is raised, catch sleeve 23 rests on catch pin 25. If the screw 32 is passed through the through hole 29 in catch sleeve 23 and screwed into the internal thread 31 of catch pin 25, the motor/pump unit 1 is held firmly on the sound-deadening hood 9. In the same way, another screw, which is not shown in FIG. 3, is passed through the through hole 28 in catch sleeve 22 and screwed into the internal thread 30 of catch pin 24. Even when there are shocks during transportation, the motor/pump unit 1 is now held securely on the sound-deadening hood 1. The bars that have been passed through the lugs 20 and 21 and by means of which the motor/pump unit 1 has been raised can now be removed. To transport the arrangement comprising motor/pump unit 1 and sound-deadening hood 9, lifting gear provided for this purpose engages on the transportation lugs 34.

What is claimed is:

1. An arrangement for absorbing sound emanating from a motor/pump unit, the arrangement having a sound-deadening cover for the motor/pump unit, wherein the sound-deadening cover is a sound-deadening hood, the sound-deadening hood is placed over the motor/pump unit and is spaced apart from the motor/pump unit to avoid touching the motor/pump unit during operation of the motor/pump unit, and the sound-deadening hood and the motor/pump unit are supported by a common support during said operation, and the sound-deadening hood and the motor/pump unit are separated from the common support and are supported on one another during a transportation of the motor/pump unit, wherein the arrangement further comprises catches for holding the motor/pump unit during a raising of the sound-deadening hood, the catches being located on the motor/pump unit and on the sound deadening hood, the catches being aligned in a self-centering manner to permit their engagement for enabling said raising.

2. An arrangement for absorbing sound emanating from a motor/pump unit, the arrangement having a sound-deadening cover for the motor/pump unit, wherein the sound-deadening cover is a sound-deadening hood, the sound-deadening hood is placed over the motor/pump unit and is spaced apart from the motor/pump unit to avoid touching the motor/pump unit during operation of the motor/pump unit, and the sound-deadening hood and the motor/pump unit are supported on one another to permit transportation of the arrangement, wherein catches, which hold the motor/pump unit during a raising of the sound-deadening hood, are arranged on the motor/pump unit and on the sound deadening hood, and the catches engage in one another in a self-centering manner to permit a raising operation.

3. The arrangement as claimed in claim 2, wherein the catches each include a catch pin with a frustoconical outer surface and a catch sleeve with a frustoconical inner surface.

4. The arrangement as claimed in claim 3, wherein the catch sleeve is provided with a through hole, and the catch is provided with an internal thread.

5. The arrangement as claimed in claim 4, further comprising screws passing through the catches for holding the sound-deadening hood and the motor/pump unit against one another during a transportation of the motor/pump unit.

6. The arrangement as claimed in claim 5, wherein the screws are provided with a transportation lug at a head end.

7. An arrangement for absorbing sound emanating from a motor/pump unit, the arrangement having a sound-deadening cover for the motor/pump unit, wherein the sound-deadening cover is a sound-deadening hood, the sound-deadening hood is placed over the motor/pump unit and is spaced apart from the motor/pump unit to avoid touching the motor/pump unit during operation of the motor/pump unit, and the sound-deadening hood and the motor/pump unit are supported on one another to permit transportation of the arrangement, wherein catches, which hold the sound-deadening hood during a raising of the motor/pump unit, are arranged on the motor/pump unit and on the sound-deadening hood, and the catches engage in one another in a self-centering manner to permit a raising operation.

8. The arrangement as claimed in claim 7, wherein the catches each include a catch pin with a frustoconical outer surface and a catch sleeve with a frustoconical inner surface.

9. The arrangement as claimed in claim 8, wherein the catch sleeve is provided with a through hole, and the catch pin is provided with an internal thread.

10. The arrangement as claimed in claim 9, further comprising screws passing through the catches for holding the sound-deadening hood and the motor/pump unit against one another during a transportation of the motor/pump unit.

11. The arrangement as claimed in claim 10, wherein the screws are provided with a transportation lug at a head end.

* * * * *